United States Patent [19]
Takeda

[11] Patent Number: 5,574,709
[45] Date of Patent: Nov. 12, 1996

[54] AUTOMATIC GAIN CONTROL SYSTEM AND INFORMATION REPRODUCTION APPARATUS USING IT

[75] Inventor: Junichi Takeda, Tokyo, Japan

[73] Assignee: Canon Kabushiki Kaisha, Tokyo, Japan

[21] Appl. No.: 277,105

[22] Filed: Jul. 20, 1994

[30] Foreign Application Priority Data

Jul. 22, 1993 [JP] Japan ................................. 5-201247

[51] Int. Cl.⁶ ............................................ G11B 7/00
[52] U.S. Cl. .......................... 369/59; 369/124; 369/47; 360/46
[58] Field of Search .......................... 369/44.25, 44.29, 369/44.35, 47, 48, 49, 53, 54, 58, 59, 84, 124; 360/45, 46, 48

[56] References Cited

U.S. PATENT DOCUMENTS

| | | | |
|---|---|---|---|
| 5,345,342 | 9/1994 | Abbott et al. | 360/48 |
| 5,414,689 | 5/1995 | Maeda et al. | 369/59 X |
| 5,436,771 | 7/1995 | Yun | 360/46 X |

Primary Examiner—Georgia Y. Epps
Assistant Examiner—Muhammad N. Edun
Attorney, Agent, or Firm—Fitzpatrick, Cella, Harper & Scinto

[57] ABSTRACT

An AGC system controls the amplitude of a reproduction signal read out from a recording medium at a predetermined level by adjusting the gain of an AGC amplifier. The AGC system includes a differentiator which differentiates the output signal of the AGC amplifier and then outputs a resultant differential signal. A rectifier rectifies the output differential signal. An operation unit compares the output signal of the rectifier with a predetermined reference value and outputs an error signal corresponding to the difference between them. The gain of the AGC amplifier is adjusted according to the error signal so that the output signal of the AGC amplifier and the output signal of the differentiator may be controlled at respective predetermined levels. The amplitude level of a reproduction signal can be maintained at a predetermined level regardless of the MTF characteristics of an optical system or other factors and a single AGC circuit can provide both reproduction signals which are suitable for both mark edge recording and mark position recording.

16 Claims, 9 Drawing Sheets

FIG. 5(a) REPRODUCTION SIGNAL

FIG. 5(b) OUTPUT SIGNAL OF DIFFERENTIATOR

FIG. 5(c) OUTPUT SIGNAL OF AGC AMPLIFIER

AUTOMATIC GAIN CONTROL SYSTEM AND INFORMATION REPRODUCTION APPARATUS USING IT

BACKGROUND OF THE INVENTION

1. Field of the Invention

The present invention relates to an information reproduction apparatus for reproducing information recorded on a recording medium, and, more specifically, to an Automatic Gain Control [AGC] circuit for controlling the amplitude of a reproduction signal read out from a recording medium at a constant level.

2. Description of the Related Art

FIG. 1 is a block diagram illustrating an example of an AGC circuit for use in an information reproduction circuit of an optical disk. As is known well, fluctuations occur in a reproduction signal reproduced from a recording medium due to various factors. One known technique for avoiding this problem is to employ an AGC circuit which controls the gain of an amplifier for amplifying a reproduction signal so that the amplitude of the reproduced signal is maintained at a constant level. Two information recording techniques are known. One is a mark position recording technique, and the other is a mark edge recording technique. In the following description, an AGC circuit for use in conjunction with the mark position technique will be described. In the AGC circuit of FIG. 1, a bottom clamping circuit 2 is connected to the output of an AGC amplifier 1 so that negative portions of the reproduction signal amplified by the AGC amplifier 1 may be clamped by the bottom clamping circuit 2. The signal amplitude of the output signal of the bottom clamping circuit 2, that is, the amplitude of positive portions of the reproduction signal, is compared to a predetermined reference voltage Vref by an operational amplifier 3. The AGC amplifier 1 outputs a control signal corresponding to the difference obtained from this comparison. The gain of the AGC amplifier 1 is adjusted according to the central signal so that the amplitude of the reproduction signal will be at a level equal to the reference voltage. The reproduction signal, whose amplitude is maintained constant in the above-described manner, is subjected to signal processing, such as binarization, in a processing circuit of the following stage so as to generate reproduction data.

FIG. 2 is a block diagram illustrating another example of a conventional AGC circuit. In this AGC circuit, a reproduction signal is differentiated by a differentiator 4, whereby its amplitude is smoothed so as to remain at a constant level. Then the differentiated signal is input to an AGC amplifier 1. Full-wave rectification is performed on the output of the AGC amplifier 1 by a full-wave rectifier 5. The resultant output signal of the full-wave rectifier 5 is provided to an operational amplifier 3. The operational amplifier compares the full-wave-rectified signal provided by the full-wave rectifier 5 with a reference voltage Vref, and outputs a control signal corresponding to a difference between them. The gain of the AGC amplifier 1 is adjusted according to the control signal so as to maintain the amplitude of the reproduction signal at a constant level. In this case, a differentiated reproduction signal is output as a constant-amplitude reproduction signal.

The AGC circuit shown in FIG. 1, since the amplitude of the reproduction signal is directly detected, attenuation of high frequency components of the reproduction signal occurs due to modulation transfer function (MTF) characteristics of an optical system. As a result, the amplitude of the reproduction signal varies depending on the frequency. In a technique commonly used to avoid this problem, the signal level of a VFO signal disposed at the beginning of data of each sector of a recording medium is detected, and the gain of the AGC amplifier is determined based on the result of the detection, wherein the gain is fixed to this determined value during the signal reproduction of the other portion of the data. In such a technique, however, since the gain of the amplifier is fixed, if there is a fluctuation in reflectivity of a disk during reading of data in one sector or a fluctuation in reproduction laser power, then the amplitude of the reproduction signal varies depending on these fluctuations. Therefore, there is still difficulty with control to maintain the amplitude of the reproduction signal at a constant level.

Furthermore, a timing signal for representing a position of the VFO signal is required, which gives rise to an increase in the complexity of sequential control for starting an apparatus.

In the AGC circuit shown in FIG. 2, since the output signal is provided in the form of a differentiated signal, it has a problem that binarization of the reproduction signal cannot be performed correctly when it is used to reproduce a recorded signal according to the mark edge recording technique, while it can be used with no problems for mark position recording. In the mark position recording technique, a reproduction signal is converted into a binary signal in such a manner that the reproduction signal is differentiated, and then a zero-crossing point is detected so as to employ the location of this zero-crossing point as the location of a mark position. Thus, there is no problem when using the mark position recording technique.

On the other hand, in the reproduction of a signal recorded by the mark edge recording technique, the reproduction signal is compared with a slice level so as to detect the location of the mark edge. However, the AGC circuit shown in FIG. 2 can provide only a differential signal. One technique to obtain a binary mark edge signal from such a differential signal is to further differentiate the above differential signal to generate a second-order differential signal, whose zero-crossing location is detected so as to obtain a binary mark edge signal. However, in this technique, when the differential signal is further differentiated, high frequency noise increases. As a result, the binary signal includes greater jitter than that obtained by the above-described level slicing technique.

In view of the above, it is an object of the present invention to provide an AGC system and an information reproduction apparatus which can control the amplitude level of a reproduction signal such that it is always maintained at a predetermined level regardless of MTF characteristics of an optical system, and which can also generate a reproduction signal well suited both for binarization of a mark-edge-recording signal and for binarization of a mark-position-recording signal.

SUMMARY OF THE INVENTION

According to a first aspect of the present invention to achieve the above object, there is provided an AGC system for controlling the amplitude of a reproduction signal read out from a recording medium at a predetermined level by adjusting the gain of an AGC amplifier, the AGC system includes a differentiating unit which differentiates the output signal of the AGC amplifier, and then outputs a resultant differential signal, a rectifying unit that rectifies the output differential signal, and an operation unit which compares the output signal of the rectifying unit with a predetermined reference value and outputs an error signal corresponding to the difference between them. The gain of the AGC amplifier is adjusted according to the error signal so that the output signal of the AGC amplifier and the output signal of the differentiating unit may be controlled at respective predetermined levels.

According to a second aspect of the present invention, there is provided an information reproduction apparatus for reproducing information recorded on a recording medium by controlling the amplitude of a reproduction signal read out from the recording medium at a predetermined level, and by processing the reproduction signal. The apparatus includes a sensing unit that detects light provided via the recording medium, an AGC amplifier to which the output signal of the sensing unit is applied, a differentiating unit that differentiates the output signal of the AGC amplifier, a rectifying unit that rectifies the output signal of the differential unit, and an operation unit which compares the output signal of the rectifying unit with a predetermined reference value and outputs an error signal corresponding to the difference between them. The gain of the AGC amplifier is adjusted according to the error signal so that the output signal of the AGC amplifier and the output signal of the differentiating unit may be controlled at respective predetermined levels.

DESCRIPTION OF THE PREFERRED EMBODIMENTS

Figure 1:
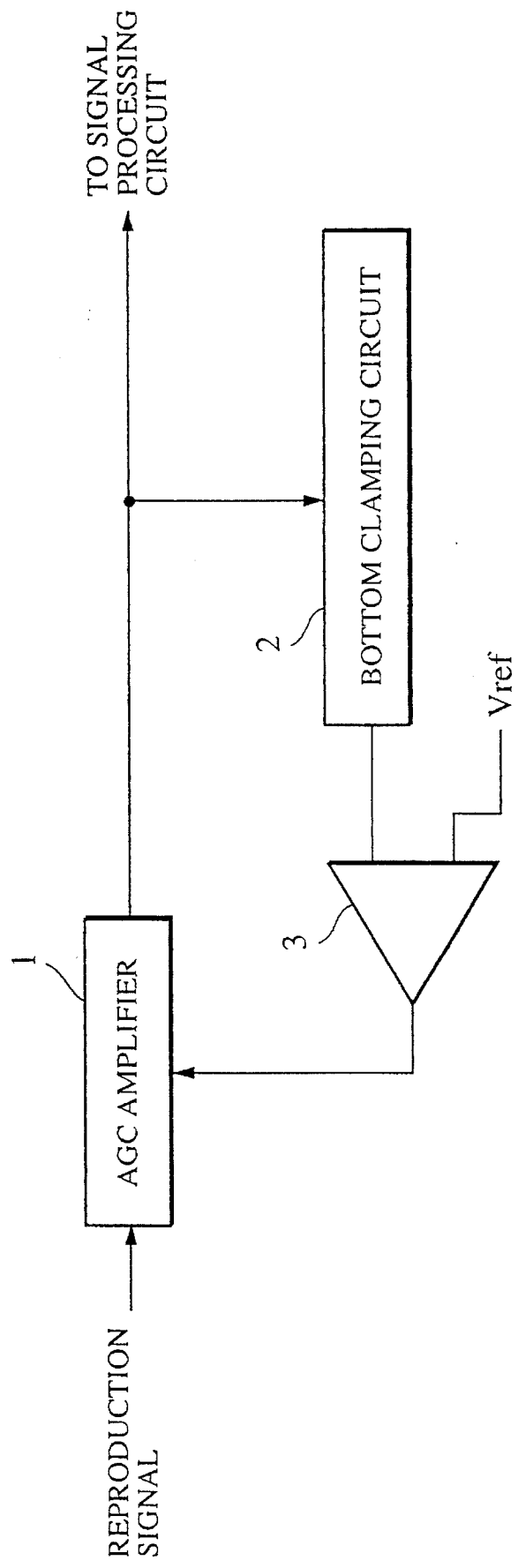
FIG. 1 is a block diagram illustrating a conventional AGC circuit.
Figure 2:
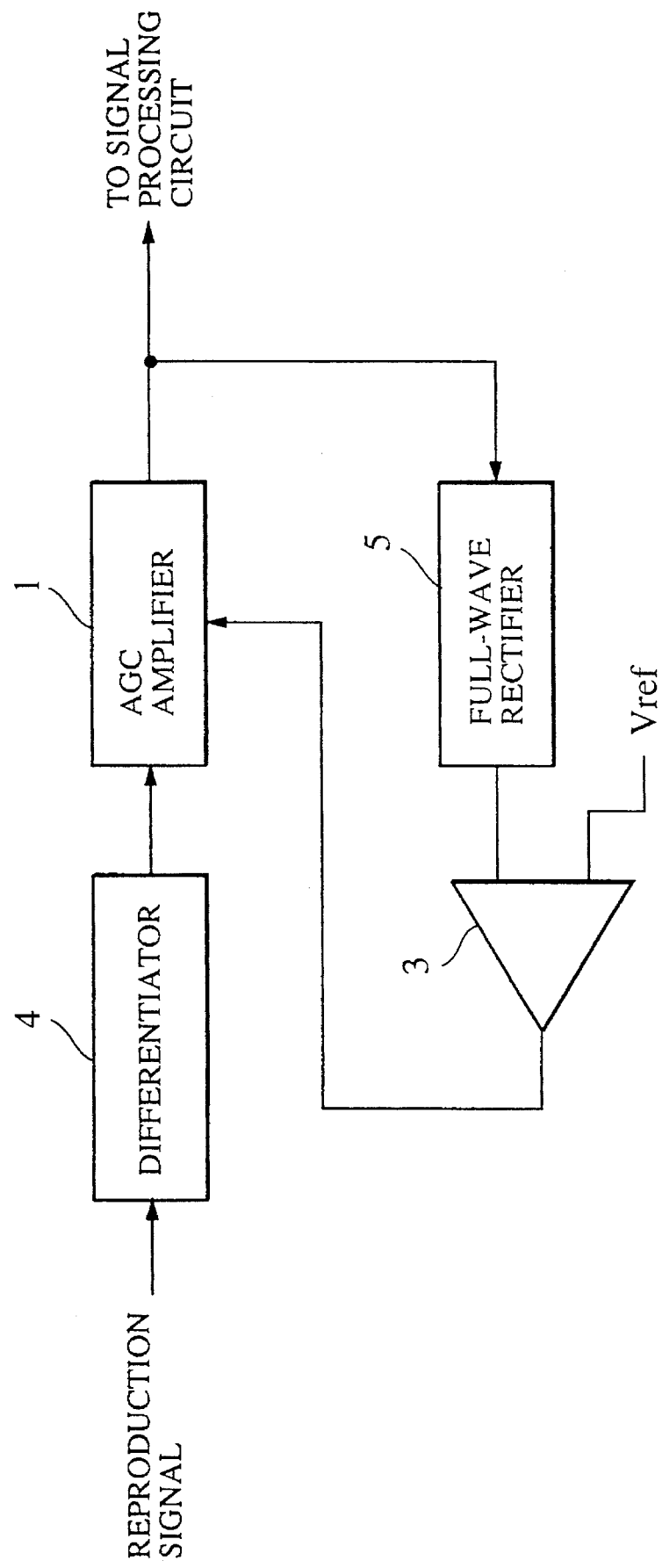
FIG. 2 is a block diagram illustrating another conventional AGC circuit.
Figure 3:
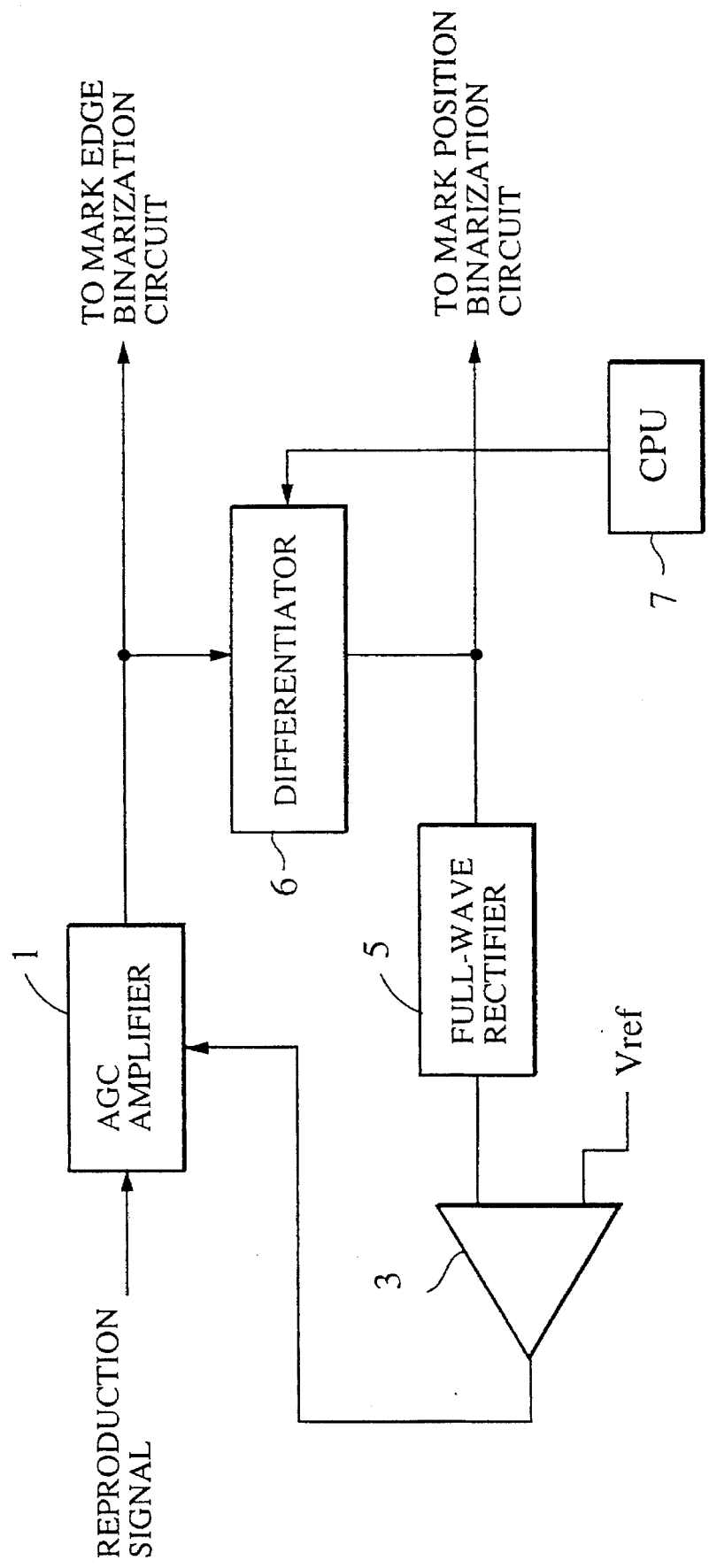
FIG. 3 is a block diagram illustrating an embodiment of an AGC system according to the present invention.

Referring to the drawings, preferred embodiments of the present invention will be described below in detail. FIG. 3 is a block diagram illustrating one embodiment of an AGC system according to the present invention. In FIG. 3, elements similar or corresponding to those in FIG. 1 or 2 are denoted by the same reference numerals as those in FIG. 1 or 2, and description of these elements will not be repeated. In FIG. 3, a reproduction signal is obtained by reading a signal from a recording medium such as an optical disk. That is, the reproduction film is obtained by detecting a reproduction light beam reflected from the recording medium by an optical sensor of an optical head (not shown), and converting the detected signal from an optical form to an electrical form. In reproduction of information, information tracks of a recording medium are illuminated with a reproduction light beam, as described above, and recorded information is reproduced based on a detection signal of the reflected light. The reproduction signal is input to an AGC amplifier 1. The gain of the AGC amplifier is adjusted, in a manner which will be described later. so as to maintain the amplitude of the reproduction signal at a constant level. As will be described later in detail, the output signal of the AGC amplifier is provided as a mark-edge-recording reproduction signal to a mark edge binarization circuit disposed at the following stage. The output of the AGC amplifier is connected to a differentiator 6 which differentiates the output signal of the AGC amplifier 1 according to a predetermined differential time constant, thereby smoothing the amplitude of the output signal at a constant value. The differentiated signal is provided as a mark-position-recording reproduction signal to a mark position binarization circuit disposed at the following stage. Specific examples of a mark edge binarization circuit and a mark position binarization circuit will be described later in detail. The output signal of the differentiator 6 is subjected to full-wave rectification by a full-wave rectifier 5 and thus converted into a DC signal, which is further provided to an operational amplifier 3. The operational amplifier 3 compares the output of the full-wave rectifier 5 with a predetermined reference voltage Vref, and outputs an error signal corresponding to the difference between them. The output of the operational amplifier 3 is provided to a gain control terminal of the AGC amplifier 1. The gain of the AGC amplifier is adjusted according to the output of the operational amplifier 3 so that the amplitude of the differential signal of the differentiator 6 may be maintained at a constant level.

Since the output signal of the AGC amplifier 1 is differentiated and smoothed at a constant level, and then feedback control is performed based on this differentiated and smoothed signal, as described above, the amplitude of the differential signal of the differentiator 6 is always maintained at a constant level even if the amplitude of the reproduction signal varies due to the MTF characteristics of the optical system. In the above operation, the feedback control is done based on the detected output signal of the differentiator 6 so that the differential signal of the differentiator 6 may be maintained at a constant level, as a result of which the output of the AGC amplifier 1 is also maintained at a constant level. The differential time constant of the differentiator 6 is set to a proper value according to an instruction provided by a CPU 7. In a ZCAV system (also called a modified CAV (MCAV) system) in which a recording medium is divided into plural zones wherein each zone has a different recording frequency, the differential time constant of the differentiator 6 is adjusted for each zone under the control of the CPU 7, as will be described later in detail.

Figure 4:
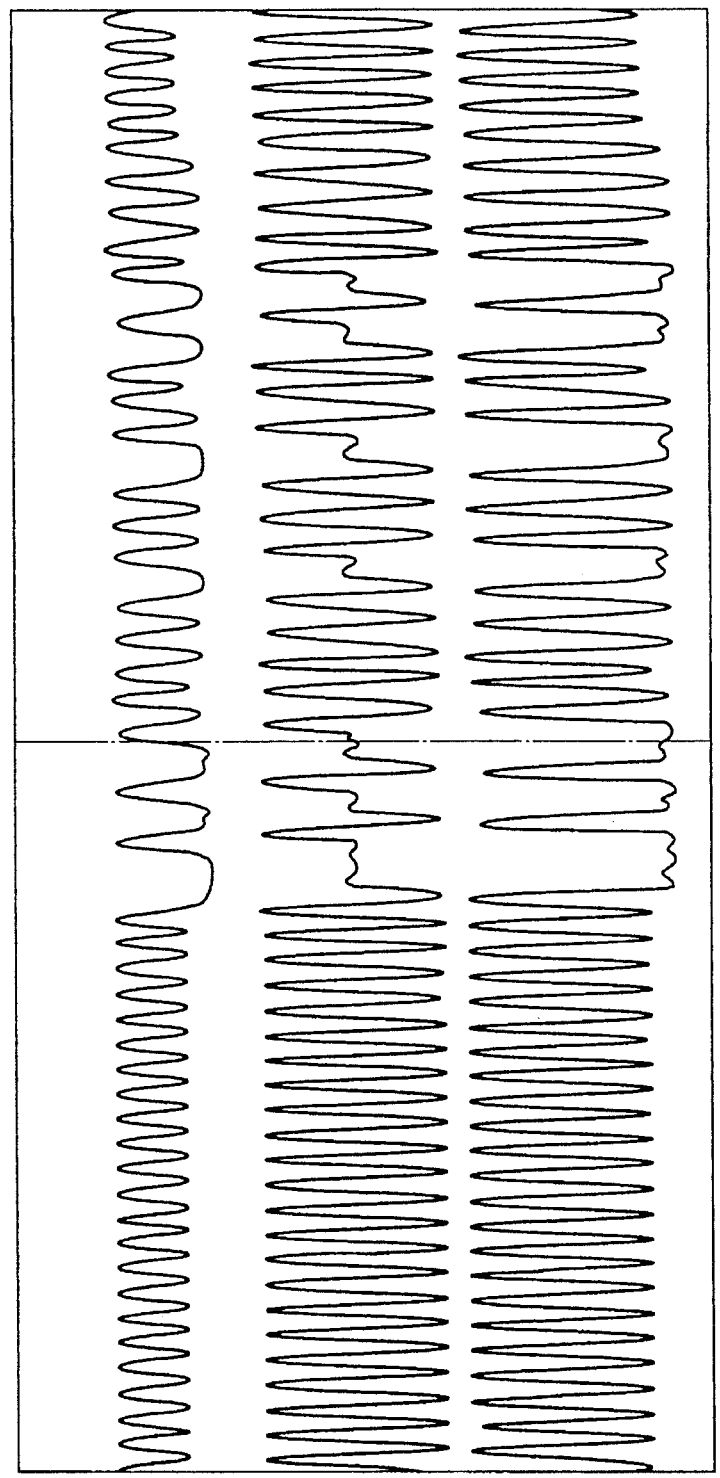
FIGS. 4(a), 4(b) and 4(c) illustrate waveforms of signals at various stages of the system of the embodiment shown in FIG. 3, wherein a reproduction signal according to a mark position recording technique is input to the system.

FIGS. 4 (a), 4 (b) and 4 (c) illustrate signals at various stages of the system of the embodiment shown in FIG. 3, wherein FIG. 4 (a) illustrates a reproduction signal read out from a recording medium, FIG. 4 (b) illustrates an output signal of the differentiator. 6, and FIG. 4 (c) illustrates an output signal of the AGC amplifier 1. The signals shown in FIGS. 4 (a)–(c) represent such signals which may be obtained when a signal recorded according to the mark position recording technique is reproduced. The reproduction signal of FIG. 4(a) shows a reduction in amplitude in a range of high frequencies. This is due to the fact that reductions of high frequency components occur due to the MTF characteristics of the optical system. Such variations in the amplitude of the reproduction signal are suppressed by the above-described control operation and the amplitude is maintained at a constant level. Thus, the differential signal showing FIG. 4(b) is output as a reproduction signal for mark position recording.

Figure 5:
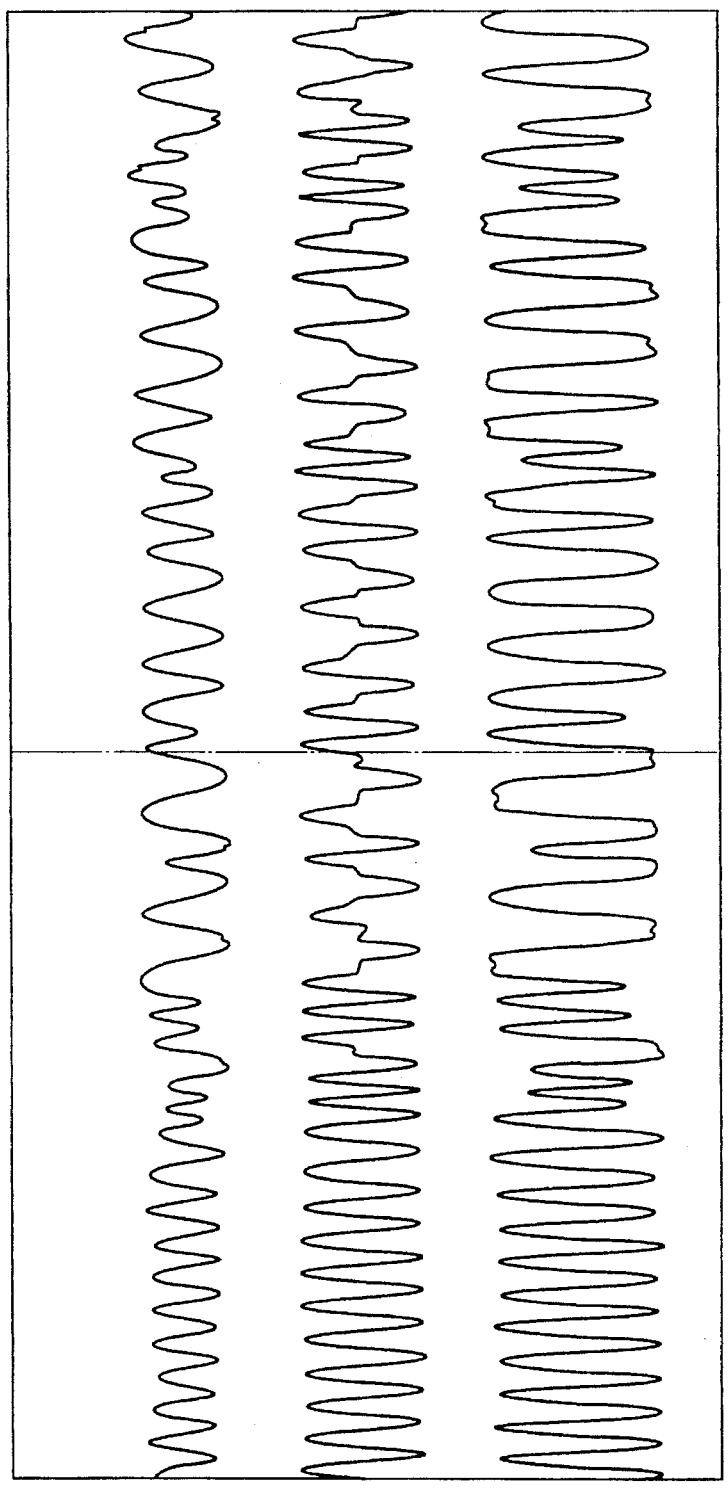
FIGS. 5(a), 5(b) and 5(c) illustrate waveforms of signals at various stages of the system of the embodiment shown in FIG. 3, wherein a reproduction signal according to a mark edge recording technique is input to the system.

FIGS. 5(a), 5(b) and 5(c) illustrate signals at various stages of the system for the case where a mark-edge-recording signal is reproduced, wherein FIG. 5(a) illustrates a reproduction signal read out from a recording medium, FIG. 5(b) illustrates an output signal of the differentiator 6, and FIG. 5(c) illustrates an output signal of the AGC amplifier 1. The reproduction signal of FIG. 5(a) also shows reductions of high frequency components due to the MTF characteristics of the optical system. However, control is performed so that the signal levels may be maintained at constant values, as shown in FIGS. 5(b) and 5(c). In this case, the output signal of the AGC amplifier 1, shown in FIG. 5(c), is output as a reproduction signal for mark edge recording.

Figure 6:
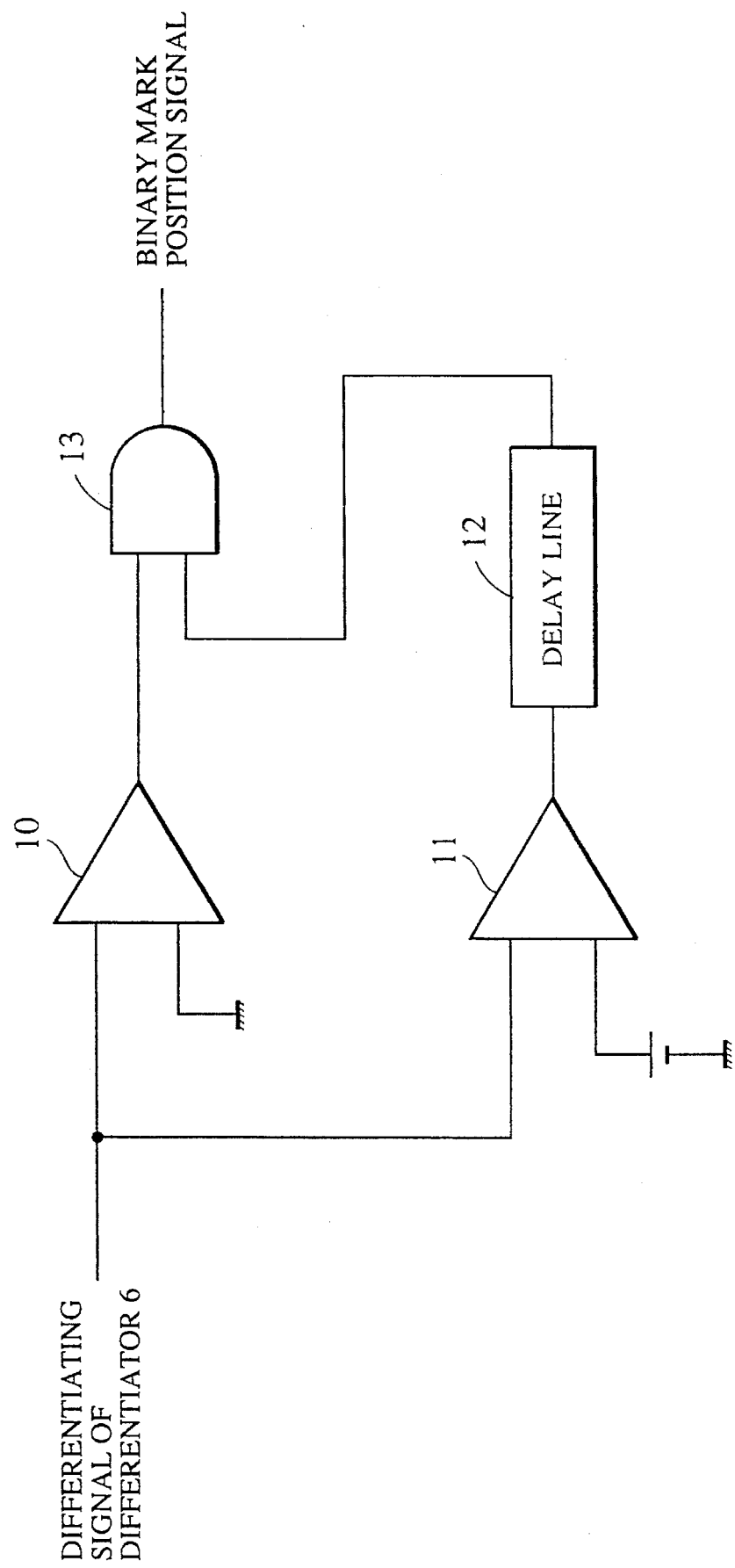
FIG. 6 is a circuit diagram illustrating an example of a mark position binarization circuit.

FIG. 6 is a circuit diagram illustrating an example of a mark position binarization circuit. In reproduction of a mark-position-recording, the output signal of the differentiator 6 is used as a reproduction signal to be input to the binarization circuit, as described above. In FIG. 6, reference numeral 10 denotes a zero-crossing comparator which compares the differential signal of the differentiator 6 shown in FIG. 4(b) with a zero level so as to detect a zero-crossing position of the differential signal. The zero-crossing position of the differential signal is a signal corresponding to a mark position. This zero-crossing position signal is output as a binary mark position signal. Furthermore, the differential signal of the differentiator 6 is also compared with a reference voltage having predetermined level by a window comparator 11. If the differential signal is greater than the reference level, the window comparator 11 outputs a high-level window pulse.

This pulse signal is delayed by a delay line 12 so that the pulse signal may fit in timing with the binary mark position signal provided by the zero-crossing comparator 10, and then provided to an AND circuit 13. Thus, the AND circuit is open only when a window pulse is generated. Therefore, even if the zero-crossing comparator 10 operates incorrectly due to noise or for other reasons at a time at which there is no reproduction signal, incorrect detection of a zero-crossing point may be prevented. The binary mark position signal generated by the zero-crossing comparator 10 is transmitted to a signal processing circuit (not shown), which generates reproduction data by performing required signal processing such as decoding. A window pulse may also be generated by using the output signal of the AGC amplifier 1 instead of the differential signal.

In the case where information reproduction is performed for information recorded according to a mark position recording technique with a constant angular velocity (CAV) system in which information is recorded onto a recording medium (an optical disk, for example) at a constant recording frequency, the most significant problem is a difference in the amplitude of the reproduction signal between inner and outer circumferences arising from the MTF characteristics of an optical system. Such a difference between inner and outer circumferences also appears in the amplitude of the differential signal. In the embodiment shown in FIG. 3, the above problem is solved by performing feedback control so that the differential signal of the differentiator 6 remains at a constant level, that is, the gain of the AGC amplifier 1 made larger for inner circumferences and smaller for outer circumferences. As a result, such a difference in the amplitude of the reproduction signal between inner and outer circumferences is suppressed by the adjustment of the gain of the AGC amplifier 1. Thus, a reproduction signal whose amplitude is controlled so as to maintain a constant level. For the reason described above, when information recorded according to the mark position recording technique is reproduced by a CAV system, a fixed differential time constant may be used for the differentiator 6 regardless of the location of a recording medium over a range from inner to outer circumferences.

Now, reproduction of information recorded according to the mark position recording technique using a ZCAV system will be discussed in which a recording medium is divided into plural zones, each zone having a different recording frequency at which information is recorded in that zone. Unlike the previous case, no difference appears in the amplitude of a reproduction signal between inner and outer circumferences of a recording medium, since the signal is recorded with a constant mark size over a range from the inner to the outer circumferences of the recording medium. However, in a 3.5-inch optical disk for example, since the recording frequency varies by a factor of about 2 between inner and outer circumferences of a disk, the amplitude of the differential signal of the differentiator 6 varies by a factor of about 2 between inner and outer circumferences of the disk if the differential time constant of the differentiator 6 remains constant. It would be possible to suppress such a variation in the amplitude of a differential signal by controlling the gain of the AGC amplifier. However, the AGC amplifier 1 should be designed to suppress variations in the amplitude of a reproduction signal due to variation in the reflectivity of a disk, contamination of a disk surface, a control error of laser power, etc. Therefore, if an attempt is made to use the AGC amplifier 1 to suppress the variation in amplitude due to the differential time constant, it will be required to control the gain of the AGC amplifier 1 over a too wide range. Therefore, in this case, it is desirable to vary the differential time constant of the differentiator 6 according to the frequency of the zone. One specific technique to achieve the above will be described as follows. A proper differential time constant is predetermined for each zone. The CPU 7 provides a time constant control signal to the differentiator 6 each time the reproduction location comes to a new zone so as to give a correct time constant for each zone.

Figure 7:
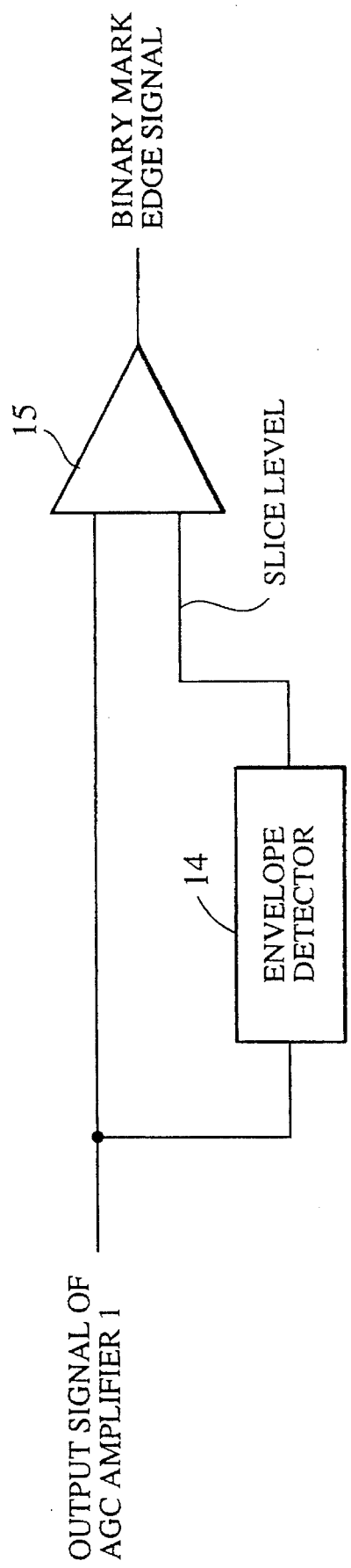
FIG. 7 is a circuit diagram illustrating an example of a mark edge binarization circuit.

FIG. 7 is a circuit diagram illustrating an example of a mark edge binarization circuit. In reproduction of a mark-edge-recording signal, the output signal of the AGC amplifier 1 shown in FIG. 3 is used as a reproduction signal to be input to the mark edge binarization circuit. In FIG. 7, reference numeral 14 denotes an envelope detector for detecting the envelope of an input signal, the envelope detector 14 outputting an intermediate value of the envelope signal as a slice level. A comparator 15 compares the output signal of the AGC amplifier 1 relative to the slice level, as a result of which the output signal of the AGC amplifier 1 is converted to a binary signal which is output as a binary mark edge signal. The obtained binary signal is provided to a signal processing circuit which performs processing required to generate reproduction data.

As in the case of reproduction of a mark-position-recording signal, in reproduction of information recorded according to a mark position recording technique using a CAV system, a difference in the amplitude of the reproduction signal also appears between inner and outer circumferences due to the MTF characteristics of an optical system. However, in the case of the embodiment shown in FIG. 3, feedback control is done so that the differential signal of the differentiator 6 may be maintained at a constant level, thereby also maintaining the output signal of the AGC amplifier 1 at a constant level. Therefore, it is possible to suppress the difference in the amplitude of the reproduction signal between inner and outer circumferences by adjusting the gain of the AGC amplifier 1. In this case, a constant differential time constant may be used for the differentiator 6. However, since AGC control associated with a signal which is not differentiated is performed based on a differentiated signal, the differential time constant should be selected such that the selected differential time constant will not induce a difference in the signal level between before and after differentiation. Such a differential time constant may be determined by the maximum frequency of a reproduction signal.

Next, an explanation will be given below regarding reproduction of information recorded according to the mark edge recording technique using a ZCAV system. Since the recording frequency varies with the zone, as in the case of reproduction of a mark-position-recording signal, if the differential time constant of the differentiator 6 is fixed, then the amplitude of the output signal of the AGC amplifier 1 will become greater for inner circumferences and smaller for outer circumferences. This occurs due to the fact that the gain of the differentiator 6 is small for a low frequency at inner circumferences, and large for a high frequency at outer circumferences. Therefore, it will be preferable to vary the differential time constant of the differentiator 6 corresponding to the frequency of the zone. As in the case of the CAV, it is also required to select the differential time constant such that the selected differential time constant will not induce a difference in the signal level between before and after differentiation.

In the present embodiment, as described above, the output signal of the AGC amplifier is differentiated by the differentiator, and the gain of the AGC amplifier is controlled based on the detected differential signal so that the amplitude of the output signal of the AGC amplifier, as well as the amplitude of the differential signal of the differentiator, may be maintained at a constant level regardless of the reduction in the amplitude of high frequency components due to the MTF characteristics of the optical system. Thus, the amplitude of a reproduction signal may be controlled so as to always remain at a constant level, independent of the MTF characteristics of the optical system, the variation of the reflectivity of a recording medium, the variation of the reproduction laser power, etc. The output signal of the AGC amplifier can be used as a reproduction signal for the mark edge recording without the necessity of further differentiating a first-order differential signal to obtain a binary signal. As a result, it is possible to obtain a binary signal without an increase of jitter, which is best suited to the mark edge recording. Furthermore, since the differential signal of the differentiator is also available as a reproduction signal for the mark position recording, a single AGC circuit can provide reproduction signals suitable for the mark edge and mark position recording.

Figure 8:
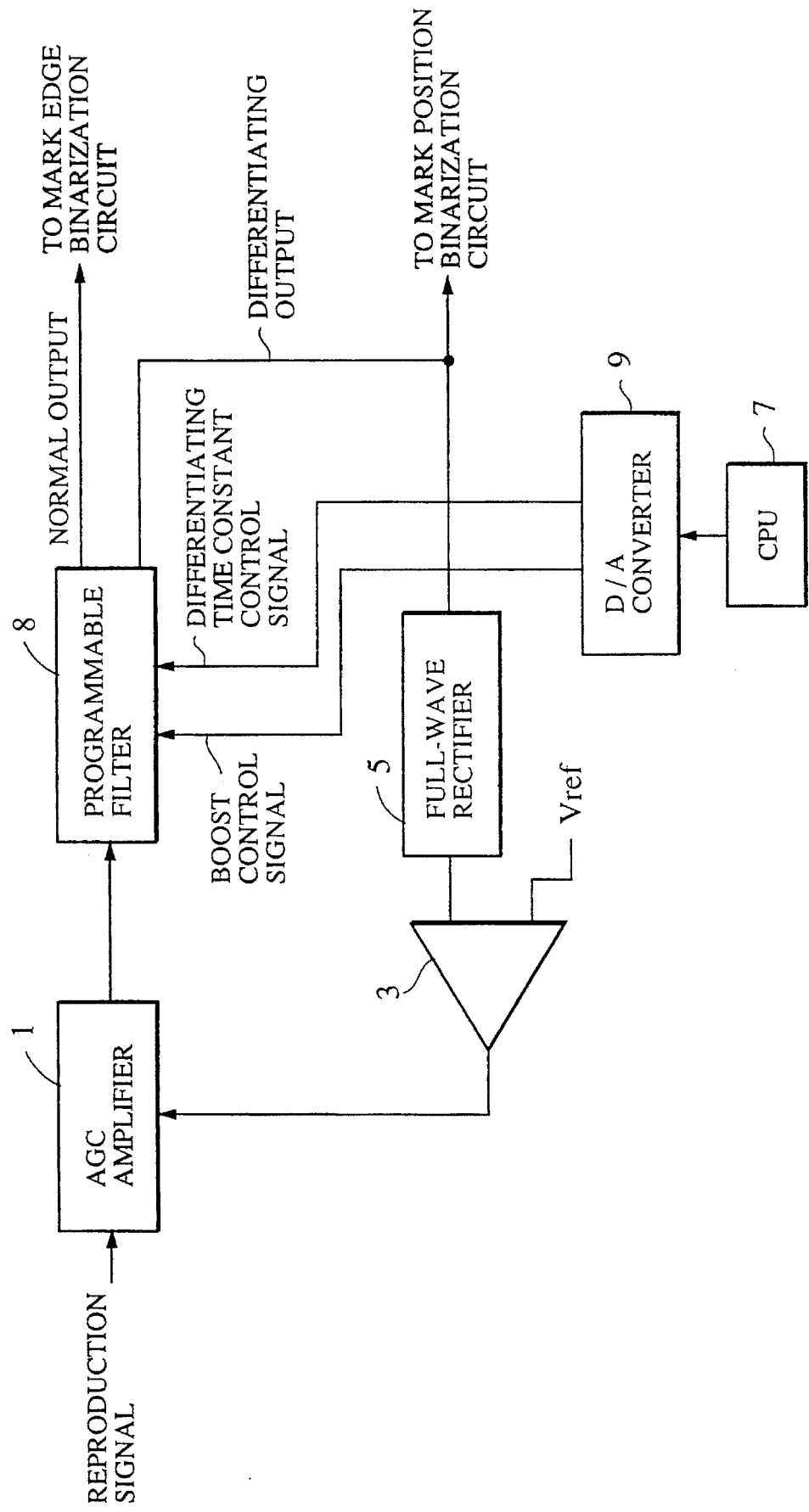
FIG. 8 is a block diagram illustrating another embodiment of the present invention.

FIG. 8 is a block diagram illustrating another embodiment of the present invention. In this embodiment, a programmable filter 8 is provided which serves as differentiating means. The programmable filter 8 is adapted such that both the amount of high frequency boosting and a differential time constant may be varied. The amount of high frequency boosting and the differential time constant are adjusted to arbitrary proper values according to a boost control signal and a differential time constant control signal provided by the CPU 7 via a D/A converter 9. A normal output of the programmable filter 8 is provided as a mark-edge-recording reproduction signal to a mark edge binarization circuit, and a differential output is provided as a mark-position-recording reproduction signal to a mark edge binarization circuit. In the case where the differential time constant of the programmable filter 8 is varied depending on the zone in a ZCAV system, the boosting frequency of the programmable filter 8 is also varied with the differential time constant under the control of the CPU 7.

According to the present embodiment, the amplitude of a reproduction signal may be controlled so as to maintain a constant level regardless of the MTF characteristics of an optical system or other factors, as in the embodiment described earlier in connection with FIG. 3. Furthermore, the normal output of the programmable filter can be used as a reproduction signal for mark edge recording, and the differential output can be used as a reproduction signal for mark position recording. Thus, a single AGC circuit can generate both reproduction signals suitable for mark edge recording and reproduction signal suitable for mark position recording.

Figure 9:
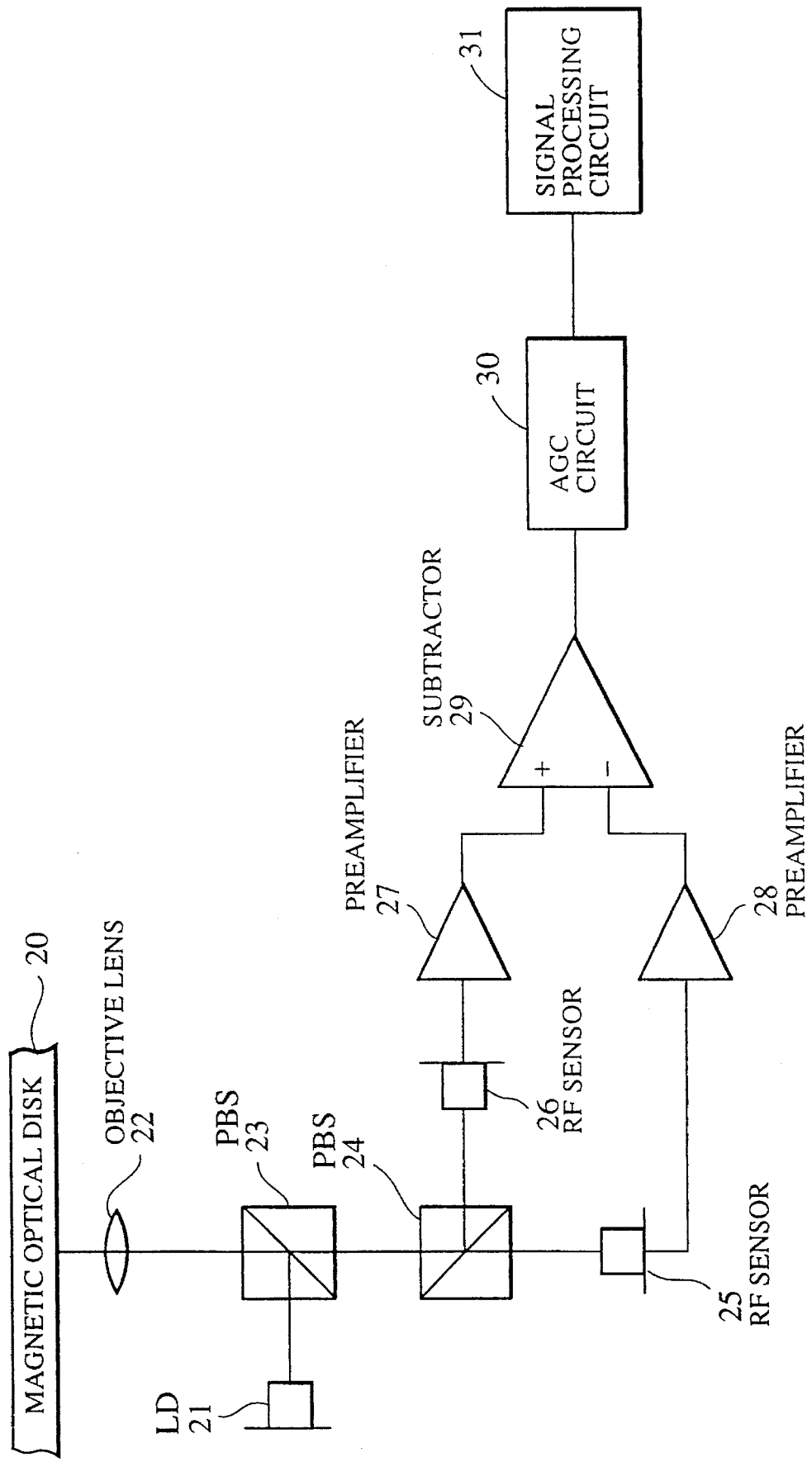
FIG. 9 is a block diagram illustrating an embodiment of an information reproduction apparatus according to the present invention.

FIG. 9 is a block diagram illustrating an embodiment of an information reproduction apparatus according to the present invention. In this embodiment, a magneto-optic reproduction apparatus is employed as an example.

A magneto-optical disk 20 is illuminated with light emitted by a laser light source 21 via a polarizing beam splitter (PBS) 23 and an objective lens 22. The light reflected from the magneto-optical disk 20 is divided into two light beams by the PBS 24, which are incident on RF sensors 25 and 26, respectively. The signals detected by the RF sensors 25 and 26 are supplied via preamplifiers 27 and 28 to a subtracter 29 which amplifies these signals in a differential fashion (according to the so-called differential detection method).

The magnitude of differential-amplified reproduction signal is controlled at a constant level by an AGC circuit similar to that shown in FIG. 3 or 8, and then the reproduction signal is transmitted to a desired signal processing circuit 31. The signal processing circuit 31 may include circuits such as those shown in FIG. 6 or 7.

According to the information reproduction apparatus of the present invention, it is possible to achieve accurate and stable reproduction of information.

In the embodiments described above, the output signal of an AGC amplifier is used as a mark-edge-recording reproduction signal, and the differential signal is used as a mark-position-recording reproduction signal. However, the present invention is not limited only to that. For example, according to the definition of the ISO standard, a sector mark signal in a preformat signal can be used as a mark edge signal. Since pattern detection accuracy required for this signal is not so rigid as for information signals, the differential signal may be used to obtain a binary signal. More specifically, detection may be achieved by inputting the differential signal to a hysteresis comparator, or by generating a second-order differential signal to be detected by a zero-crossing comparator. As for a recording medium for use in the present invention, various type media such as a medium which uses irregularities, DRAW, or phase change to record signals, a magneto-optical medium, etc., may be employed.

In the present invention, as described above, the output signal of an AGC amplifier is differentiated, and the gain of the AGC amplifier is controlled so that the amplitude of the differential signal may be maintained at a constant level, thereby maintaining the amplitude of a reproduction signal at a constant level regardless of the MTF characteristics of an optical system or other factors..Furthermore, the output signal of the AGC amplifier is provided as a reproduction signal for mark edge recording, thereby obtaining a correct binary mark edge signal without increasing jitter. Since the differential output can also be provided as a reproduction signal for mark position recording, a single AGC circuit can generate both reproduction signals which are suitable for mark edge recording and reproduction signals suitable for mark position recording.

What is claimed is:

1. An AGC system for controlling the amplitude of a reproduction signal read out from a recording medium at a predetermined level by adjusting the gain of an AGC amplifier, said AGC system comprising:

differentiating means for differentiating an output signal of said AGC amplifier, and for outputting a resultant differential signal;

rectifying means for rectifying said output differential signal; and operation means which compares the rectified output differential signal of said rectifying means with a predetermined reference value, and outputs an error signal corresponding to the difference between the rectified output differential signal of the rectifying means and the predetermined reference value;

wherein the gain of said AGC amplifier is adjusted according to said error signal so that the output signal of said AGC amplifier and the resultant differential signal of said differentiating means are controlled at respective predetermined levels, and wherein the output signal of said AGC amplifier is output as a reproduction signal for mark edge recording, and the resultant differential signal of said differentiating means is output as a reproduction signal for mark position recording.

2. An AGC system according to claim 1, wherein, for a recording medium divided into plural zones each having a different recording frequency, a differential time constant associated with said differentiating means is varied according to the recording frequency associated with each zone of the medium.

3. An AGC system according to claim 1, wherein said differentiating means includes a programmable filter, the output of said programmable filter being output as a reproduction signal for mark edge recording, the resultant differential signal being output as a reproduction signal for mark position recording.

4. An AGC system according to claim 1, wherein said rectifying means includes a full-wave rectifier.

5. A method for controlling the amplitude of a reproduction signal read out from a recording medium at a predetermined level by adjusting the gain of an AGC amplifier, said method comprising the steps of:

differentiating an output signal of the AGC amplifier, and then outputting a resultant differential signal;

rectifying the resultant differential signal;

comparing the rectified resultant differential signal with a predetermined reference value, and outputting an error signal corresponding to the difference between the rectified resultant differential signal and the predetermined reference level; and adjusting the gain of said AGC amplifier according to the error signal so that the output signal of the AGC amplifier and the resultant differential signal may be controlled at respective predetermined levels, wherein the output signal of the AGC amplifier is output as a reproduction signal for mark edge recording, and the resultant differential signal is output as a reproduction signal for mark position recording.

6. A method according to claim 5, wherein, for a recording medium divided into plural zones each having a different recording frequency, a differential time constant associated with said step of differentiating the output signal of the AGC amplifier and outputting a resultant differential signal is varied according to the recording frequency associated with each zone of the recording medium.

7. A method for controlling the amplitude of a reproduction signal read out from a recording medium at a predetermined level by adjusting the gain of an AGC amplifier, said method comprising the steps of:

inputting an output of the AGC amplifier to a programmable filter, and outputting a normal output and a differential output;

rectifying the differential output;

comparing the rectified differential output with a predetermined reference value, and outputting an error signal corresponding to the difference between the rectified differential output and the predetermined level; and adjusting the gain of the AGC amplifier according to the error signal so that the normal output and the differential output are controlled at respective predetermined levels.

8. A method according to claim 7, wherein the normal output is output as a reproduction signal for mark edge recording, and the differential out put is outputted as a reproduction signal for mark position recording.

9. An information reproduction apparatus for reproducing information recorded on a recording medium by controlling the amplitude of a reproduction signal read out from the recording medium at a predetermined level, and by processing said reproduction signal, said apparatus comprising:

sensing means for detecting light provided via said recording medium, said sensing means producing an output signal;

an AGC amplifier to which the output signal of said sensing means is applied, said AGC amplifier producing an output signal;

differentiating means for differentiating the output signal of said AGC amplifier, said differentiating means producing an output signal;

rectifying means for rectifying the output signal of said differentiating means, said rectifying means producing an output signal; and operation means for comparing the output signal of said rectifying means with a predetermined reference value, and outputting an error signal corresponding to a difference between the rectifying means output signal and the predetermined reference value;

wherein the gain of said AGC amplifier is adjusted according to said error signal so that the output signal of said AGC amplifier and the output signal of said differentiating means are controlled at respective predetermined levels, and wherein the output signal of said AGC amplifier is output as a reproduction signal for mark edge recording, and the output signal of said differentiating means is output as a reproduction signal for mark position recording.

10. An information reproduction apparatus according to claim 9, wherein, for a recording medium divided into plural zones each having a different recording frequency, a differential time constant associated with said differentiating means is varied according to the recording frequency associated with each zone of the recording medium.

11. An information reproduction apparatus according to claim 9, wherein said differentiating means includes a programmable filter having a normal output and a differential output, the normal output of said programmable filter being output as a reproduction signal for mark edge recording, and the differential output being output as a reproduction signal for mark position recording.

12. An information reproduction apparatus according to claim 9, wherein said rectifying means include a full-wave rectifier.

13. An information reproduction method for reproducing information recorded on a recording medium by controlling the amplitude of a reproduction signal read out from the recording medium at a predetermined level, and by processing said reproduction signal, said method comprising the steps of:

detecting light provided via the recording medium;

inputting a signal corresponding to the detected light to an AGC amplifier and outputting a resulting signal from the AGC amplifier;

differentiating the output signal of the AGC amplifier, and outputting a resulting differential signal;

rectifying the resulting differential signal and outputting a rectified signal;

comparing the rectified signal with a predetermined reference value, and outputting an error signal corresponding to the difference between the rectified signal and the predetermined level; and adjusting the gain of said AGC amplifier according to the error signal so that the output signal of the AGC amplifier and the differential signal are controlled at respective predetermined levels, wherein the output signal of the AGC amplifier is output as a reproduction signal for mark edge recording, and the differential signal is output as a reproduction signal for mark position recording.

14. A method according to claim 13, wherein, for a recording medium divided into plural zones each having a different recording frequency, a differential time constant associated with the differentiating step is varied according to the recording frequency associated with each zone of the recording medium.

15. An information reproduction method for reproducing information recorded on a recording medium by controlling the amplitude of a reproduction signal read out from the recording medium at a predetermined level, and by processing said reproduction signal, said method comprising the steps of:

detecting light provided via the recording medium;

inputting a signal corresponding to the detected light to an AGC amplifier;

inputting an output signal of the AGC amplifier to a programmable filter and outputting a normal output and a differential output from the programmable filter;

rectifying the differential output;

comparing the rectified differential output with a predetermined reference value, and outputting an error signal corresponding to the difference between the rectified differential output and the predetermined level; and adjusting the gain of the AGC amplifier according to the error signal so that the normal output and the differential output are controlled at respective predetermined output levels.

16. A method according to claim 15, wherein the normal output is output as a reproduction signal for mark edge recording, and wherein the differential output is output as a reproduction signal for mark position recording.

* * * * *

UNITED STATES PATENT AND TRADEMARK OFFICE
CERTIFICATE OF CORRECTION

PATENT NO. : 5,574,709

DATED : November 12, 1996

INVENTOR(S) : JUNICHI TAKEDA

It is certified that error appears in the above-identified patent and that said Letters Patent is hereby corrected as shown below:

IN THE DRAWINGS

Sheet 9 of 9, "SUBTRACTOR" should read --SUBTRACTER--.

COLUMN 1

Line 17, "known well," should read --well known,--; and
Line 63, "The" should read --In the--.

COLUMN 4

Line 9, "later." should read --later,--.

COLUMN 6

Line 3, "As" should read --¶ As--;
Line 18, "Unlike" should read --¶ Unlike--; and
Line 23, "disk" should read --disk,--.

COLUMN 8

Line 18, "and-the" should read --and the--;
Line 22, "signal" should read --signals--; and
Line 56, "More" should read --¶ More--.

UNITED STATES PATENT AND TRADEMARK OFFICE
CERTIFICATE OF CORRECTION

PATENT NO. : 5,574,709

DATED : November 12, 1996

INVENTOR(S) : JUNICHI TAKEDA

It is certified that error appears in the above-identified patent and that said Letters Patent is hereby corrected as shown below:

<u>COLUMN 9</u>

Line 5, "factors..Furthermore" should read --factors.  Furthermore--.

<u>COLUMN 10</u>

Line 31, "out put" should read --output--.

Signed and Sealed this

Seventh Day of October, 1997

Attest:

BRUCE LEHMAN

*Attesting Officer*    Commissioner of Patents and Trademarks